US008220858B2

(12) United States Patent
Moenter (10) Patent No.: US 8,220,858 B2
(45) Date of Patent: Jul. 17, 2012

(54) BASE FOR USE WITH A CLIP

(75) Inventor: Jonathan Keith Moenter, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 303 days.

(21) Appl. No.: 12/608,695

(22) Filed: Oct. 29, 2009

(65) Prior Publication Data

US 2011/0101726 A1     May 5, 2011

(51) Int. Cl.
    *B60J 3/00*     (2006.01)
(52) U.S. Cl. ...................................... 296/97.9; 296/214
(58) Field of Classification Search ................. 296/97.9, 296/97.12, 97.13, 214
See application file for complete search history.

(56) References Cited

U.S. PATENT DOCUMENTS

| | | |
|---|---|---|
| 4,569,552 A | 2/1986 | Marks |
| 4,729,590 A | 3/1988 | Adams |
| 4,756,570 A | 7/1988 | Cooper |
| 4,893,866 A | 1/1990 | Dowd et al. |
| 4,989,911 A | 2/1991 | Van Order |
| 5,031,954 A | 7/1991 | Peterson et al. |
| 5,056,853 A | 10/1991 | Van Order |
| 5,061,005 A | 10/1991 | Van Order et al. |
| 5,082,323 A * | 1/1992 | Dowd et al. .................... 296/214 |
| 5,201,564 A | 4/1993 | Price |
| 5,752,853 A * | 5/1998 | Curtindale .................... 439/567 |
| 6,007,136 A * | 12/1999 | Zittwitz et al. ............... 296/97.9 |
| 6,179,365 B1 * | 1/2001 | Hennessey .................... 296/97.9 |
| 6,422,644 B1 * | 7/2002 | Miller et al. ................... 296/214 |
| 6,568,749 B2 | 5/2003 | Sawayanagi et al. |
| 6,629,717 B1 * | 10/2003 | Wilson ........................ 296/97.9 |
| 6,719,352 B2 | 4/2004 | Arendsen et al. |
| 6,726,165 B2 * | 4/2004 | Sawayanagi et al. ...... 248/224.8 |
| 6,773,051 B2 | 8/2004 | Davey et al. |
| 7,293,824 B2 * | 11/2007 | Dobson ........................ 296/214 |
| 2005/0156448 A1 * | 7/2005 | Schultz et al. ............... 296/97.9 |
| 2007/0057538 A1 * | 3/2007 | Dobson ........................ 296/214 |
| 2007/0120390 A1 * | 5/2007 | Wheeler et al. ............. 296/97.9 |

* cited by examiner

*Primary Examiner* — Jason S Morrow
(74) *Attorney, Agent, or Firm* — Gifford, Krass, Sprinkle, Anderson & Citkowski, P.C.

(57) ABSTRACT

A headliner assembly configured to retain a visor to the headliner. The headliner has an outer surface opposite an inner surface, and a visor rod aperture. The visor rod aperture is in communication with the inner and outer surface. The headliner assembly including a clip configured to retain an end portion of the visor rod. The clip is disposed on the inner surface of the headliner. The headliner assembly further includes a base having a first portion configured to retain the clip and a second portion. The outer edge of the second portion extends a predetermined distance from the first portion so as to create a moment in equal magnitude of the moment experienced by the clip when the visor rod is installed.

19 Claims, 8 Drawing Sheets

BASE FOR USE WITH A CLIP

BACKGROUND OF THE INVENTION

1. Field of the Invention

The present invention relates generally to a headliner assembly having a base and a clip operable to facilitate the installation of a headliner assembly to the roof of the vehicle. More specifically, the base aligns the clip so as to be fittingly received by the roof bracket of the roof.

2. Description of Material Art

A headliner forms an interior lining of the roof of an automotive vehicle. Various vehicle accessories such as assist grips, speakers, and sun visors may be attached to the headliner. Some of these accessories, such as the sun visor, are mounted onto the headliner prior to installing the headliner to the roof of the vehicle.

The sun visor includes a visor body adapted to receive a visor rod, and a biasing member. The biasing member is operatively attached to the visor rod so as to urge the visor body between a first and a second position when mounted to the headliner. In the first position an outer edge of the sun visor is substantially engaged with the headliner. In the second position, the sun visor is pivoted downwardly so as to shield the passenger from direct sunlight. To return the sun visor to the first position, the user simply flips the visor towards the headliner and the biasing member urges the visor to engage the headliner. Thus, the biasing member retains the visor against the headliner assembly so that the visor does not pivot downwardly and obscure a portion of the passenger's or driver's view.

Figure 7:
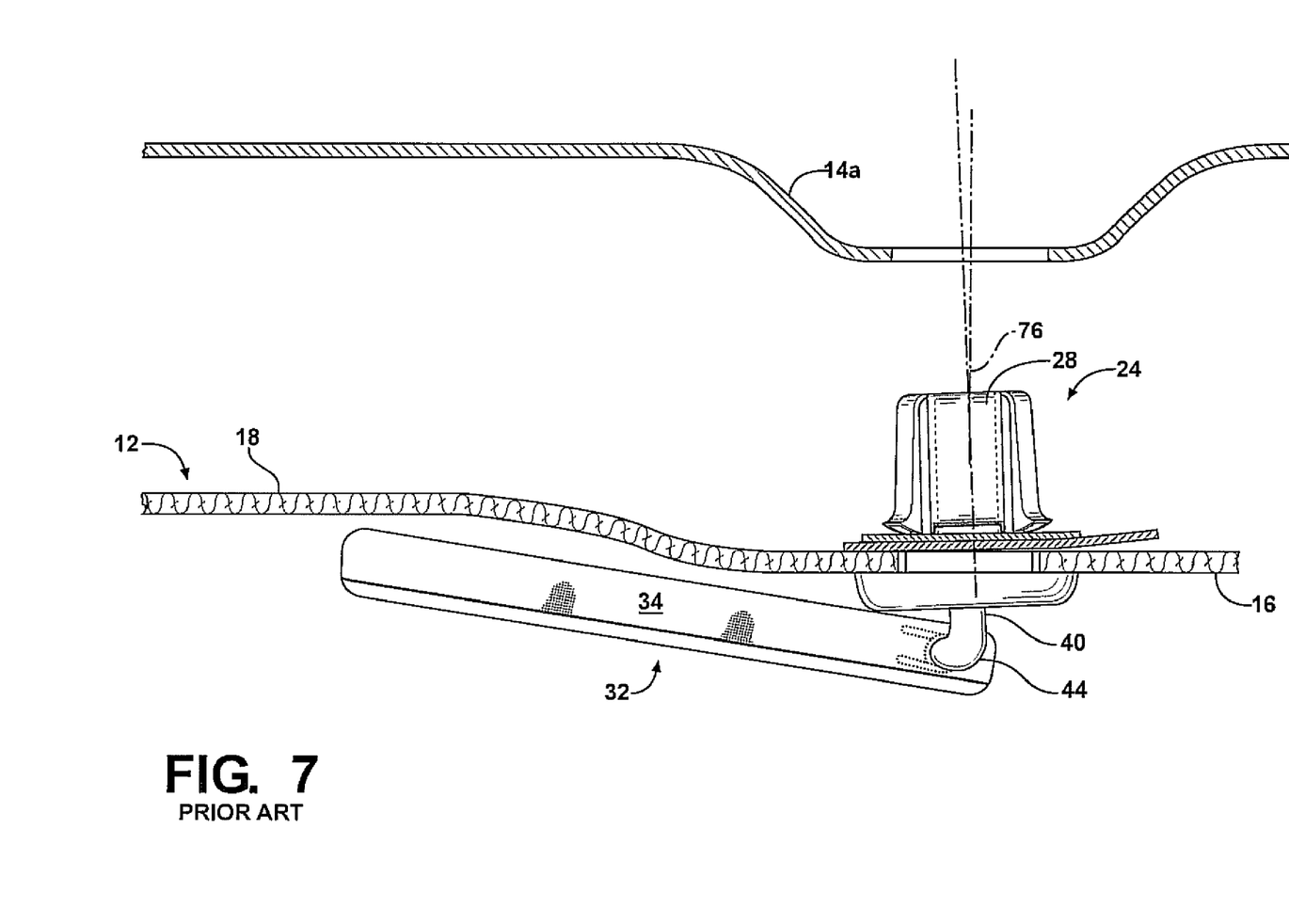
FIG. 7 is a view of the prior art, showing the headliner assembly being installed onto the roof bracket.
Figure 8:
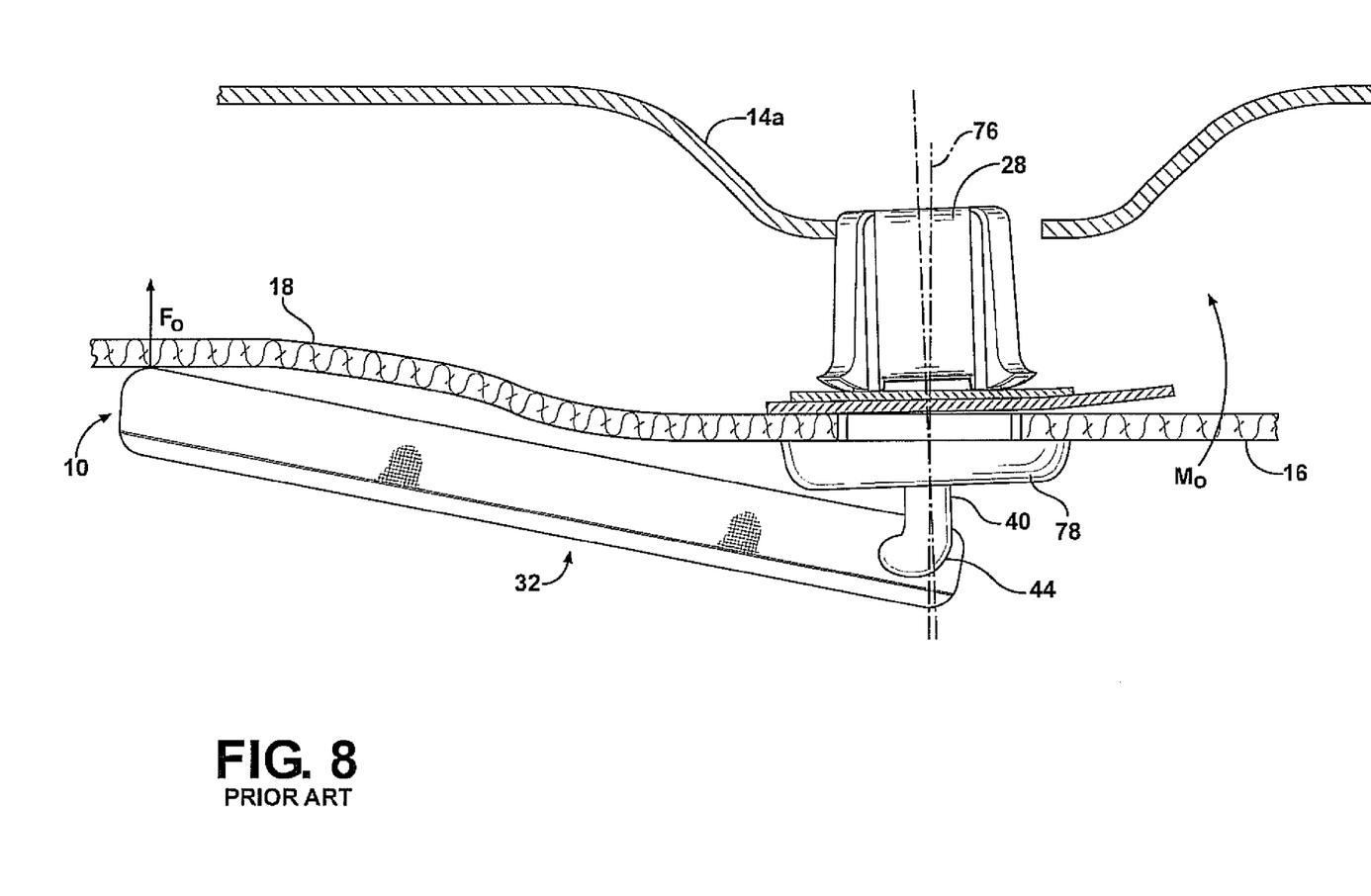
FIG. 8 is a view of FIG. 7 showing the misalignment of the clip and base.

The visor may be attached to the headliner by a clip. More specifically, as shown in the prior art figure, the sun visor is attached to an outer surface of the headliner and the visor rod is inserted into a visor rod aperture located at an upper portion of the headliner assembly, adjacent the A-Pillar. The inner surface of the headliner is in communication with the vehicle roof. The clip is attached to the inner surface of the headliner, and an end portion of the visor rod is configured to engage the clip so as to retain the visor to the headliner. As shown in the prior art, the biasing member cause the clip to be misaligned with respect to axis 76. The misaligned clip then becomes misaligned with respect to roof brackets of the vehicle roof, as shown in FIGS. 7, and 8. This misaligned clip requires the worker to exert more force to install the headliner assembly as compared to a headliner assembly where the clips are not misaligned.

As shown in FIGS. 7 and 8, the biasing member creates a force $F_0$ on the headliner assembly during installation. This force $F_0$ is translated to the end portion of the visor rod and moment $M_0$ is experienced by the clip during engagement of the end portion of the visor rod with the headliner. Moment $M_0$ may cause a portion of the clip to be displaced from the inner surface of the headliner.

The clip includes an inner surface wall defining a cavity configured to fittingly engage an end portion of the visor rod. The cavity is configured to be substantially aligned with the visor rod aperture of the headliner along a first axis 76. Displacement of an end portion of the clip may further cause the cavity of the clip to be misaligned from the first axis 76 by as much as 9 degrees. This misalignment causes the worker to exert a lot of force so as to overcome the misalignment and install the headliner assembly to the roof bracket. It is known that the misalignment may cause the worker to exert as much as 30 to 40 kilogram-force (kgf) in order to overcome the misalignment and install the clip of the sun visor to the roof bracket.

Accordingly, it remains desirable to have a device which facilitates the installation of the headliner assembly to the roof bracket. More specifically, it is desirable to have a base that creates a moment that is equal in magnitude to the moment generated when the visor is installed onto the headliner such that there is no misalignment between the clip and the headliner body. It is further desirable to have a device which creates a moment having magnitude equal to and countering the moment created so as to reduce substantially the current installation forces to about 6 kgf.

SUMMARY OF THE PRESENT INVENTION

The present invention provides for a headliner assembly configured to facilitate the installation of the headliner assembly to the roof of a vehicle. The headliner assembly includes a headliner body having an outer surface opposite an inner surface, and a visor rod aperture. The visor rod aperture is in communication with the outer surface. The visor assembly includes a visor body, a visor rod, and a biasing member. The visor body is mounted onto a portion of the visor rod. The biasing member is operable to pivot the visor body about the visor rod so as to urge the visor rod between a first position and a second position.

The headliner assembly further includes a clip and a base. The clip is configured to retain an end portion of the visor rod, and the clip is disposed on the inner surface of the headliner. The base has a first portion configured to retain a clip and a second portion operable to urge the first portion into flushing engagement with the headliner body. The base includes an outer surface extending along the first portion to the second portion. The outer surface of the first and second portions is generally planar and configured to engage the inner surface of the headliner. The second portion is a predetermined distance from the first portion. More specifically, the base is configured such that the predetermined distance and the force experienced by the base create a moment equal in magnitude to the moment experienced by the clip. Thus, during installation of the headliner assembly to the roof bracket, the first portion remains in flushing engagement with the inner surface of the headliner and the misalignment which occurs in the prior art is obviated. Accordingly, the clip is aligned along a first axis and is positioned to be fittingly received by the roof bracket.

BRIEF DESCRIPTION OF THE DRAWING

A better understanding of the present invention will be had upon reference to the following detailed description when read in conjunction with the accompanying drawing wherein like reference characters refer to like parts throughout the several views and in which.

DETAILED DESCRIPTION OF THE INVENTION

Figure 1:
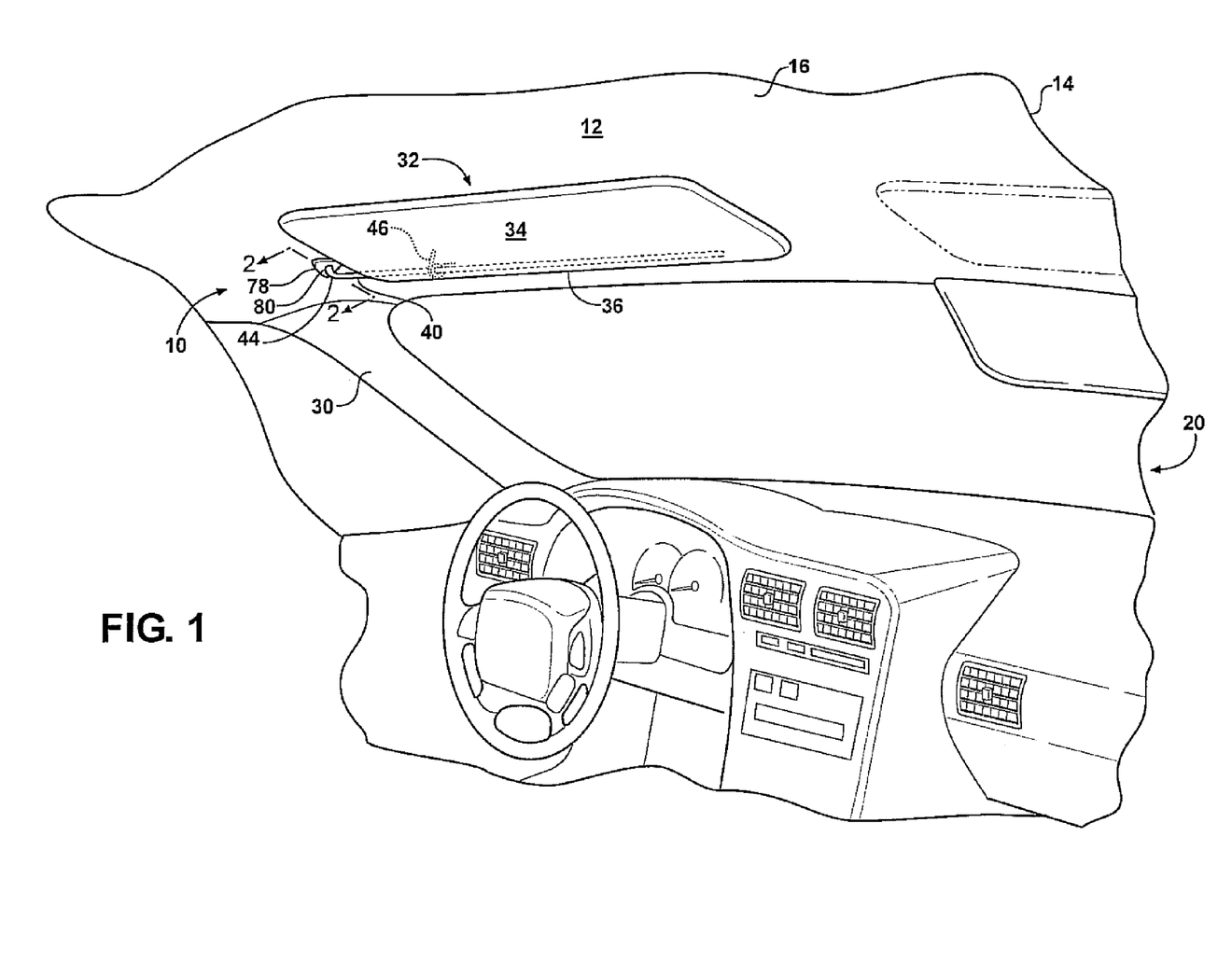
FIG. 1 is a perspective view of the interior of a cabin showing the headliner and the visor attached to the headliner.

With reference first to FIG. 1, the first preferred embodiment of a headliner assembly 10 according to the present invention is illustrated. The headliner assembly 10 includes a headliner body 12. Headliner bodies 12 are currently known and used in the art, and any such headliner body 12 is adaptable for use herein. The headliner body 12 may be formed from synthetic material such as foam and may include an aesthetic layer such as leather, felt, or synthetic leather or the like. Alternatively, the headliner body 12 may include layers of polyester fiber such as felt. Each layer may consist of low and high melted polyester fiber pieces. The layers may be attached to one another other using adhesives. A foam backing may be attached to the layers so as to form a body sufficient rigid to support the headliner body 12 against the roof 14.

The headliner body 12 includes an outer surface 16 and an inner surface 18. The inner surface 18 of the headliner body 12 is configured to attach to the roof 14 of the vehicle 20 such that the outer surface 16 of the headliner body 12 is in communication with the interior cabin space of the vehicle 20. The headliner assembly 10 further includes a base 22, clip 24 and a visor rod aperture 26. The visor rod aperture 26 extends through the headliner body 12 and is in communication with the outer and inner surfaces 16, 18 of the headliner body 12. Preferably the visor rod aperture 26 is disposed along an upper outer portion of the headliner adjacent the upper end portion 28 of the vehicle's 20 A-pillar 30.

Any visor 32 currently known and used may be adaptable for use herein, illustratively including the visor 32 shown in the figures. The visor 32 includes a visor body 34. The visor body 34 is generally rectangular in shape and may be formed of various materials having opaque properties. A first outer edge 36a of the visor body 34 includes an elongated slot 38 configured to receive the visor rod 40. The visor rod 40 includes a first elongated member 42, an end portion 28 configured to attach the visor 32 to the clip 24, and an elbow 44 interconnecting the first elongated member 42 to the end portion 28 so as to place the end portion 28 generally orthogonal to the first elongated member 42. The visor 32 further includes a biasing member 46 configured to be mounted onto a portion of the first elongated member 42 of the visor rod 40. The biasing member 46 may be a coil spring having spring legs 48 mounted along the rod and disposed within the elongated slot 38. The spring legs 48 engage the inner wall surfaces of the elongated slot 38 so as to rotate the visor 32 between a first position and second position. In the first position, the visor body 34 is stowed, and in the second position the visor body 34 is displaced from the headliner body 12.

The driver side sun visor 32 is shown in the first position where a second outer edge of the visor body 34 is pressed up against the headliner body 12. The visor 32 may be flipped downwardly into the second position wherein the visor body 34 shields the passenger's eyes from direct sunlight, as shown by the passenger side sun visor. Storing the visor 32 may be done by flipping the visor 32 towards the headliner wherein the biasing member 46 urges the visor 32 into a pressed engagement with the headliner, wherein force is stored in the biasing member 46.

Figure 2:
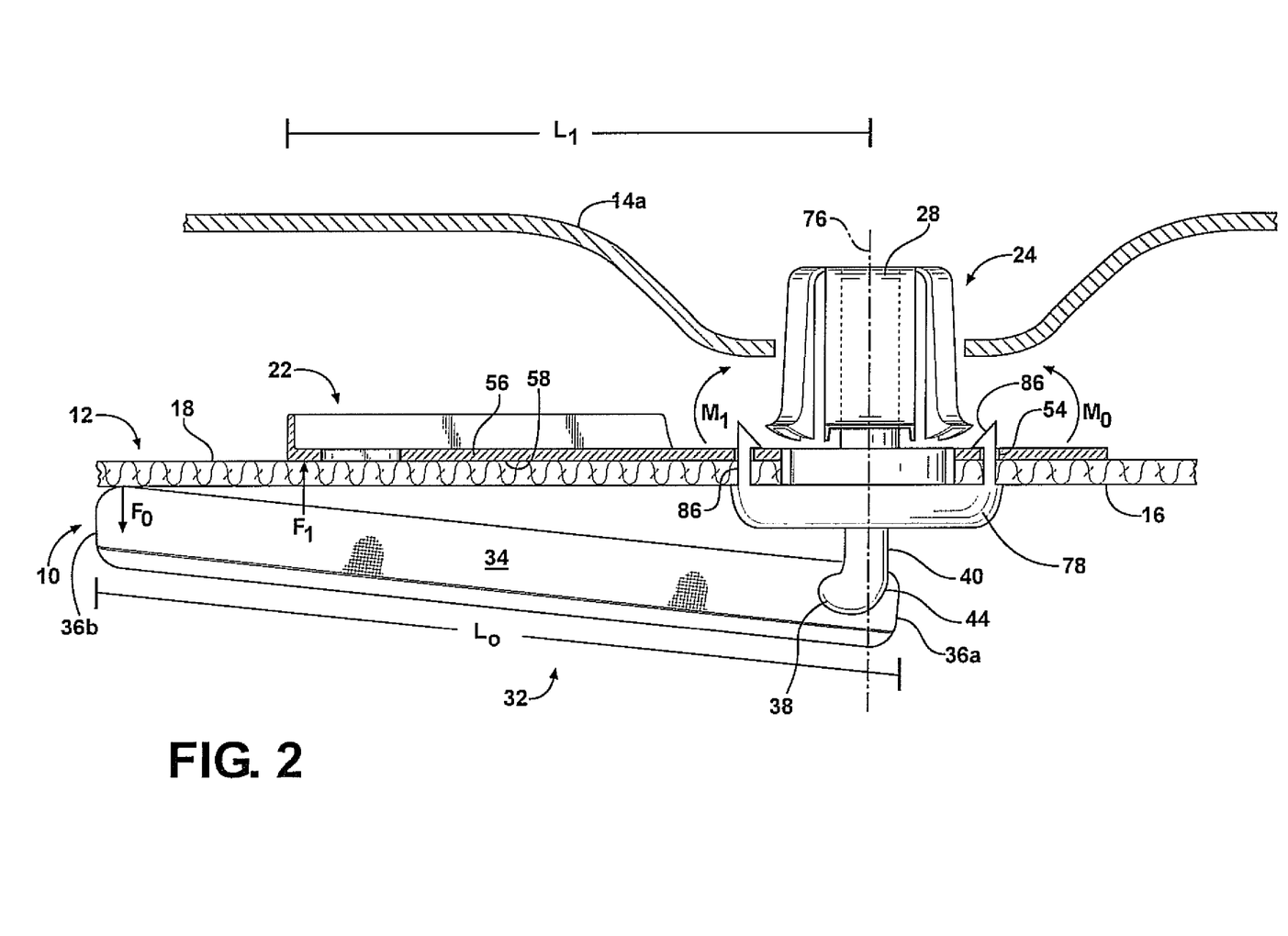
FIG. 2 is a cross-sectional view of FIG. 1 taken along line 2-2.

With reference now to FIG. 2, a cross-sectional view showing the visor 32 attached to the inner surface 18 of the headliner body 12 is provided. The inner surface 18 of the headliner assembly 10 is opposite the outer surface 16 of the headliner assembly 10 and is hidden from view when the headliner is mounted to the roof 14 of the vehicle 20. The base 22 and the clip 24 are mounted to the inner surface 18 of the headliner body 12.

The base 22 is configured to fittingly engage a portion of the inner surface 18 of the headliner. More specifically, the base 22 provides support for the attachment of an end portion 28 of the visor rod 40 to the clip 24. The base 22 includes a first portion 54, a second portion 56, and an outer surface 58 which extends along the first and second portions 54, 56. The outer surface 58 of the base 22 is placed in engagement with the inner surface 18 of the headliner body 12. The outer surface 58 of the first and second portions 54, 56 is generally planar and configured to engage the inner surface 18 of the headliner body 12. The base 22 may be formed of a material having sufficient rigidity to translate force $F_1$ of the second portion 56 to a moment $M_1$ equal to the moment experienced by the first portion 54. Such material is currently known and used in the art, illustratively including metal and metal composites such as steel, polypropylene, and other such plastics. The base 22 may be injection molded or stamped out of a sheet of metal.

The first portion 54 of the base 22 is configured to retain the clip 24. The first portion 54 includes a visor slot 60 configured to receive the end portion 28 of the visor rod 40. The second portion 56 of the base 22 is a predetermined distance from the first portion 54. More specifically, the distal end of the second portion 56 is a predetermined distance $L_1$ from the mid portion of the first portion 54, as indicated by the first axis 76.

Figure 3:
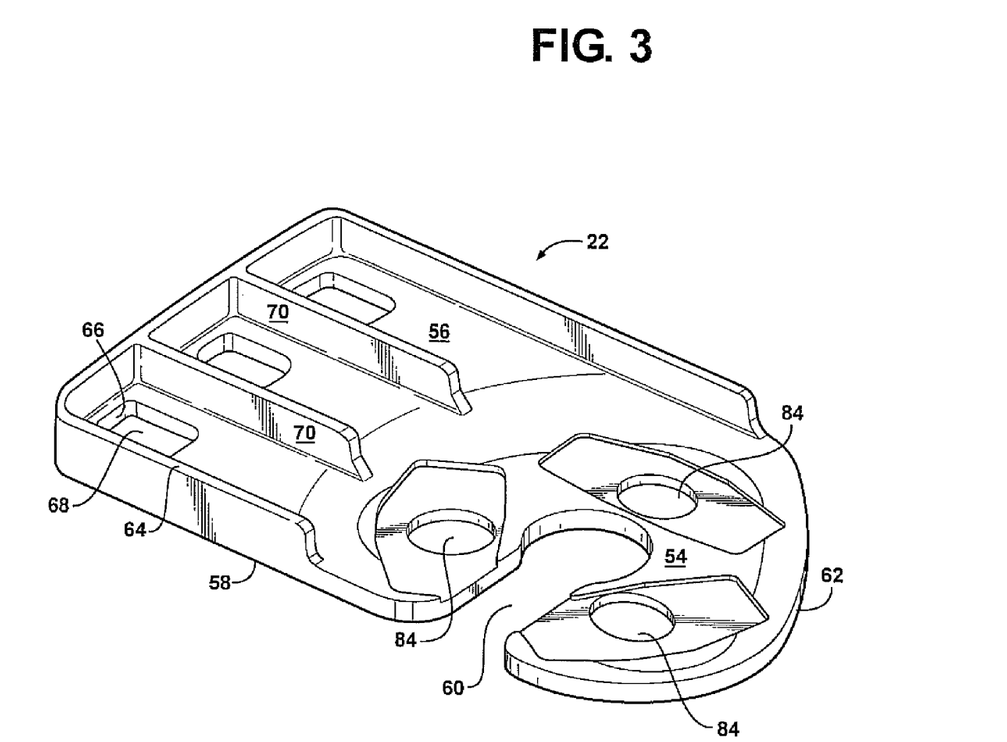
FIG. 3 is a perspective view of the base.

With reference now to FIG. 3, an isolated view of the base is provided. The base 22 may further include an outer peripheral edge 62 and a side wall 64 extending generally orthogonal along a portion of the outer peripheral edge 62. The outer peripheral edge 60 of the base 22 defines a generally scuba fin-shaped member. However, it is anticipated that the shape defined by the outer peripheral edge 60 of the base 22 may be rectangular or oval and is not limiting to the scope and spirit of the invention. The side wall 64 is disposed generally along the outer peripheral edge 62 of the second portion 56 of the base 22. The side wall 64 provides rigidity to the base 22 so as to help generate a moment upon the first portion 54 equal and counter to the moment placed upon the first portion 54 while visor 32 is in the stowed position. The second portion 56 may further include a plurality of inner peripheral edges 66, each defining a second portion aperture 68. The second portion apertures 68 reduce the mass of the base 22 so as to reduce the manufacturing cost and the weight of the base 22.

The base 22 may also include a plurality of ribs 70. The ribs 70 are disposed on the inner surface of the base 22 opposite the outer surface 58. The plurality of ribs 70 project outwardly from the base 22 and extend along the second portion 56 of the body. The ribs 70 also help maintain rigidity of the second portion 56 so as to generate sufficient moment to counter the moment that the visor 32 places on the clip 24 when the visor 32 is in the stowed position.

Figure 4:
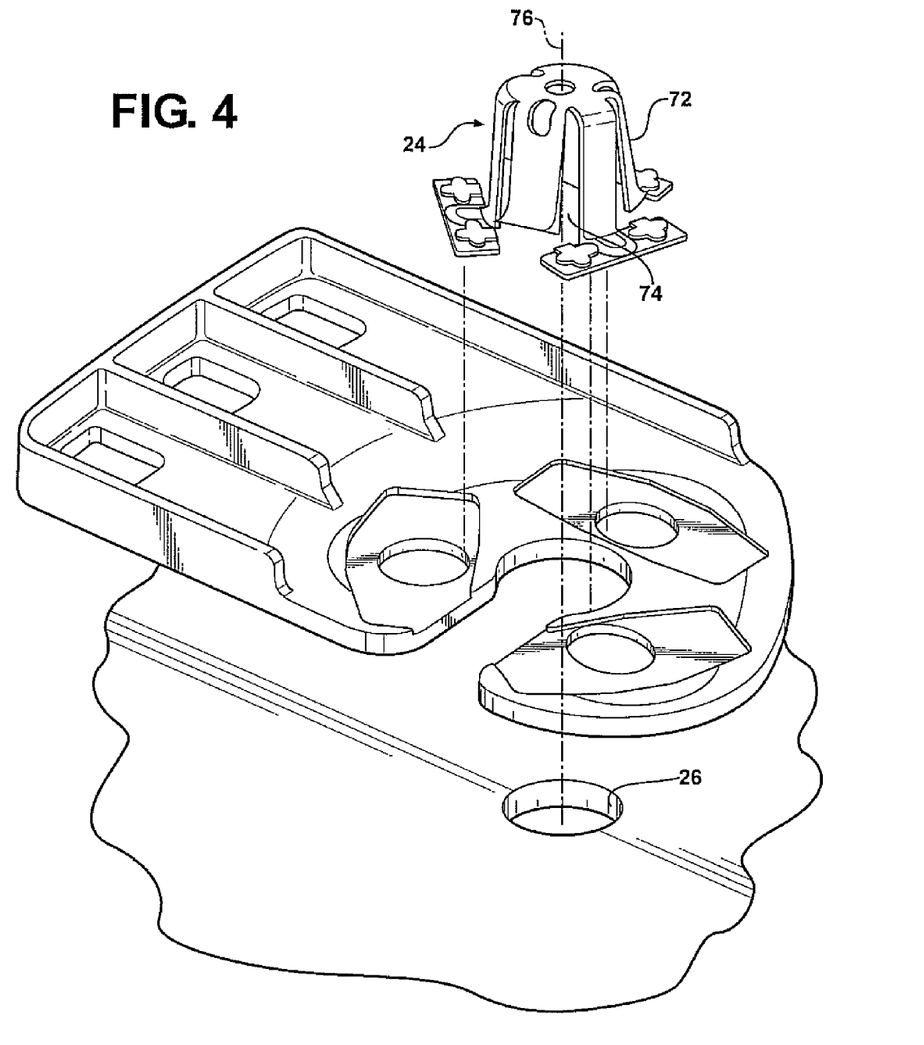
FIG. 4 is an exploded view of the clip assembly.

With reference now to FIG. 4, an exploded view of the clip and base is provided. The clip 24 is mounted over the visor slot 60. Preferably the clip 24 is made of metal such as steel. The clip 24 includes a clip wall 72 bounding an area so as to define a cavity 74. The inner surfaces of the clip wall 72 of the cavity 74 are adapted to fittingly retain the end portion 28 of the visor rod 40. The visor slot 60 is in communication with visor rod aperture 26. The cavity 74 is substantially aligned with the receiving aperture along a first axis 76.

The second portion 56 is a predetermined distance $L_1$ from the first portion 54 so as to counter the moment generated when the visor 32 is in the stowed position. Thus, as the moment created by the base 22 equals the magnitude of the moment experienced by the clip 24, the first portion 54 is in flushing engagement with the inner surface 18 of the headliner. Thus, the cavity 74 of the clip 24 is aligned along the first axis 76 so as to position the clip 24 to be fittingly received by the roof bracket 14a.

With reference again to FIGS. 1 and 2, the headliner assembly 10 may further include a visor elbow bracket 78 disposed on the outer surface 16 of the headliner. The visor elbow bracket 78 may be formed of hardened resin, or a polypropylene. The visor elbow bracket 78 has a visor elbow bracket aperture 80 configured to receive a portion of the visor rod 40 and may include at least one fastener 82. The visor elbow bracket 76 is then engaged with the first portion 54 of the base 22 so as to help retain the visor 32 to the headliner body 12.

With reference again to FIG. 2, the first portion 54 of the base 22 may further include a receiving portion 84 configured to engage the fastener 82 to the base 22. The fastener 82 may be an elongated member having a barbed end 86. The receiving portion 84 is configured so as to fittingly receive the barbed end 86 of the fastener 82 of the visor elbow bracket 76. Thus, the visor elbow bracket 78 helps secure the visor rod 40 to the base 22.

With reference again to FIG. 2, the operation of the base 22 is explained in further detail. The visor body 34 has a length of $L_0$. Upon installation, the biasing member 46 urges a second outer edge 36b of the visor body 34 against the headliner. Thus, as indicated, the headliner exerts a force $F_0$ onto the second outer edge 36b of the visor body 34. Force $F_0$ is translated along the length $L_0$ of the visor body so as to generate moment $M_0$ onto the base 22 and clip 24.

Simultaneously, the visor 32 in its stowed position creates a force $F_1$ by the headliner body 12 onto the end of the second portion 56 of the base 22. Thus, the second portion 56 is configured to be a predetermined distance $L_1$ away from the middle of the first portion 54 so as to generate moment $M_1$ such that moment $M_1$ is equal to $M_0$. Moment $M_1$ also counters moment $M_0$ generated when the visor 32 is in its stowed position. Since moments $M_1$ and $M_0$ are equal in magnitude and opposite in direction, they cancel each other out and the end portion 28 of the base 22 remains flushingly engaged with the inner surface 18 of the headliner. As the first portion 54 remains engaged, the cavity 74 of the clip 24 remains substantially aligned along the first axis 76 extending along the length of the cavity 74, the visor rod aperture 26, and the roof bracket 14a.

Figure 5:
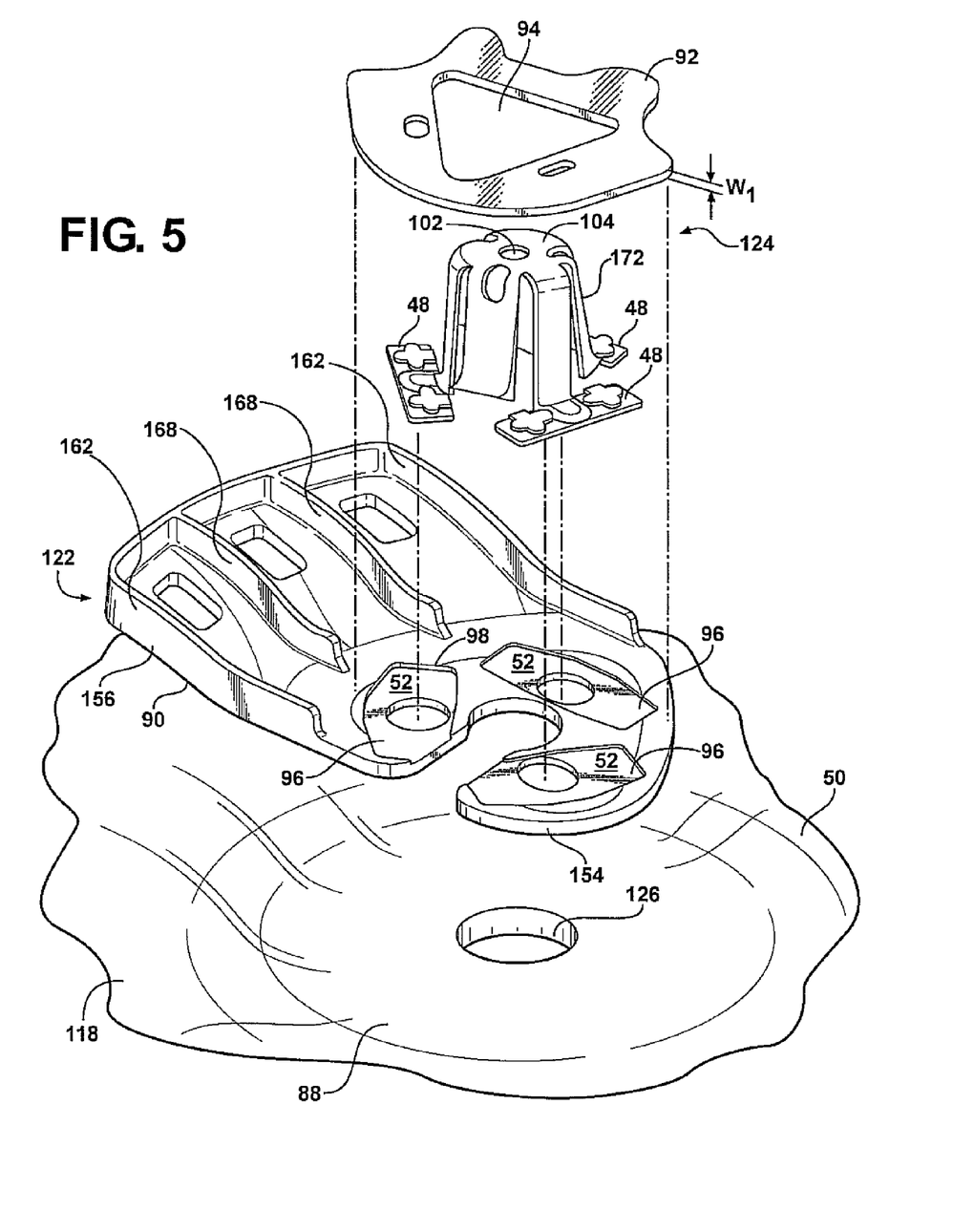
FIG. 5 is an exploded view of the first preferred embodiment of the base.
Figure 6:
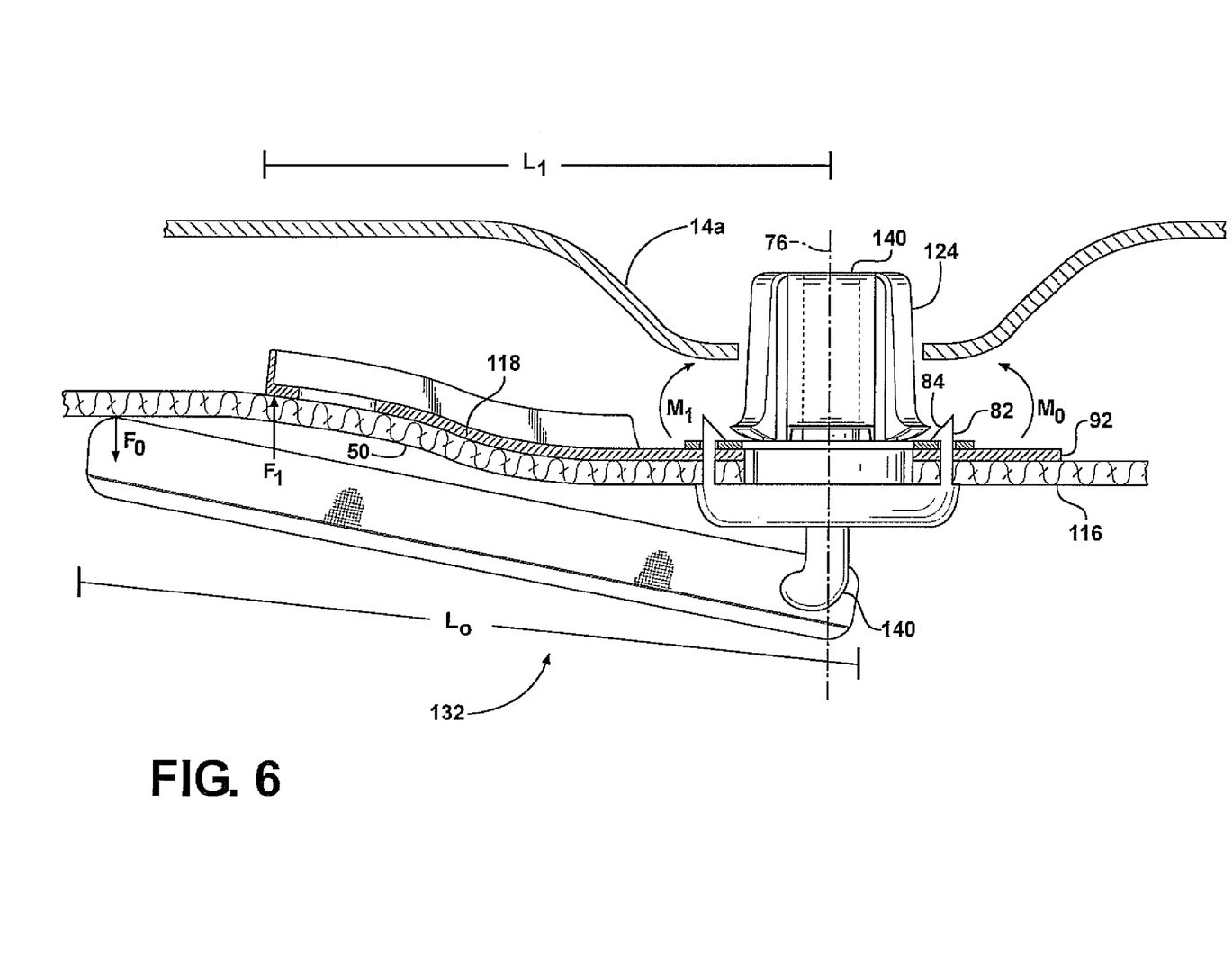
FIG. 6 is a cross-sectional view of the first preferred embodiment of the base attached to the headliner.

With reference now to FIGS. 5 and 6, a first preferred embodiment of the headliner assembly 10 is provided. Like features include like reference numerals to the previous embodiment increased by 100. The inner surface 118 of the headliner further includes an arcuate surface 50 bounding an area so as to define a depression 88. The visor rod aperture 126 is disposed on the depression 88. Thus, the outer surface 118 of the headliner includes a raised portion formed by the depression 88 on the inner surface 118 of the headliner as seen from the cabin of the vehicle. The base 122 further includes a transitional portion 90 that interconnects the first portion 154 to the second portion 156. The outer surface 158 of the transitional portion 90 is angled relative to the outer surface 158 of the first and second portions 154,156. The transitional portion 90 of the base 122 is contoured so as to flushingly engage the arcuate surface 50 of the headliner. Thus, the transitional portion 90 displaces the first portion 154 away from the second portion 156 a predetermined distance. The predetermined distance and the contoured surface of the transitional portion 90 are operable to create a moment equal in magnitude to the moment displaced on the clip 124 while the visor 132 is in the stowed position. As described above, the moment placed on the clip 124 while the visor 132 is in the stowed position equals in magnitude the moment placed on the first portion 154 of the base 122. The two moments counter each other so as to position the first portion 154 in a flushed engagement with the inner surface 118 of the headliner and the cavity 172 of the clip 124 in alignment along the first axis 174 so as to be fittingly received by the roof bracket 14a.

The headliner assembly 10 may further include a spacer 92 having a predetermined width $W_1$. The spacer 92 includes a spacer aperture 94 adapted to mount onto the first portion 154 of the base 122 so as to align the spacer aperture 94 to the slot of the first portion 154. Furthermore, the width of the spacer 92 positions the clip 124 so as to fittingly engage the roof bracket 14a.

The side walls 162 and the ribs 168 may extend along the transitional and second portions 90, 156 of the base 122. The first portion 154 may further include a plurality of support portions 96 disposed along the visor slot 60. The visor slot 60 is in communication with the outer peripheral edge 62 of the base 22 and is configured to receive a portion of the visor rod 40. The support portions 96 include an inner peripheral wall 98 bounding a predetermined area and a support surface 52. The support surface 52 extends between opposing portions of the inner peripheral wall 98 so as to form a depression on the first portion 54 of the base 22. The support portions 96 may further include apertures adapted to receive sun visor 32 components such as electrical wires and/or the fastening members disposed on the visor elbow bracket 78.

The clip 124 may be configured with a plurality of legs 48 corresponding to the number of support portions 96 disposed on the slot. The clip 24 may include an end wall 104 having an end wall aperture 102 for receiving a wire disposed along the rod or within the rod of the sun visor 32 assembly. The wire is operable to provide electrical input to power components such as a vanity mirror or the like.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A base for use with a clip, the clip is configured to attach a visor to a headliner of a vehicle, the visor having a biasing member operative to bias the visor against the headliner so as to place the visor in a stowed position and generate a moment, the headliner having an inner surface opposite an outer surface, the base comprising:
   a body having a first portion configured to retain the clip and a second portion, the body further includes an outer surface extending from the first portion to the second portion, the outer surface of the first and second portions is generally planar and configured to engage the inner surface of the headliner, and the outer surface of a distal end of the second portion is displaced a predetermined distance away from the first portion so as to counter the moment generated when the visor is in the stowed position and place the first portion in flushing engagement with the inner surface of the headliner so as to position the clip along a first axis.

2. The base as set forth in claim 1, further including a plurality of ribs, and the body further includes an inner surface opposite the outer surface, and the plurality of ribs is disposed on the inner surface of the body and extend along the second portion of the body.

3. The base as set forth in claim 1, wherein the body includes an outer peripheral edge and a side wall extending generally orthogonal along a portion of the outer peripheral edge.

4. The base as set forth in claim 3, wherein the side wall is disposed along the outer peripheral edge of the second portion of the body.

5. The base as set forth in claim 1, wherein the second portion includes a plurality of inner peripheral edges defining an aperture so as to reduce the mass of the base.

6. The base as set forth in claim 4, wherein the first portion includes a slot in communication with the outer peripheral edge, and wherein a portion of the slot is configured to receive a portion of the visor rod.

7. The base as set forth in claim 6, wherein the first portion includes a plurality of support portions disposed along the slot, and wherein the clip includes a corresponding plurality of legs, and wherein each of the plurality of support portions are configured to receive respective legs of the clip.

8. The base as set forth in claim 1, further including a transitional portion disposed between the first and second portions, the outer surface of the transitional portion angled relative to the outer surface of the first and second portions, and the outer surface of the transitional portion being generally contoured.

9. A clip assembly for facilitating the installation of a visor to a roof of a vehicle, the roof having a bracket configured to engage the clip assembly, the visor mounted to a headliner and having a biasing member operative to bias the visor against the headliner so as to place the visor in a stowed position and generate a moment, the clip assembly comprising:
a clip configured to retain an end portion of a visor rod;
a visor elbow bracket having an aperture and at least one fastener, the aperture configured to receive a portion of the visor rod; and
a base having a first portion configured to retain the clip and a second portion, the base further includes an outer surface extending from the first portion to the second portion, and the first and second portions is generally planar and configured to engage the headliner, and the outer surface of a distal end of the second portion is displaced a predetermined distance away from the first portion so as to counter the moment generated when the visor is in the stowed position and position the outer surface of the first portion flush against the headliner, and align the clip along a first axis.

10. The clip assembly as set forth in claim 9, wherein an inner surface of the headliner includes an arcuate surface bounding an area so as to define a depression, wherein the depression includes a visor rod aperture.

11. The clip assembly as set forth in claim 10, further including a transitional portion interconnecting the first portion to the second portion, an outer surface of the transitional portion is contoured so as to flushing engage the arcuate surface of the headliner.

12. The clip assembly as set forth in claim 11, further including a plurality of ribs, and wherein a body includes an inner surface opposite an outer surface, the plurality of ribs are disposed on the inner surface of the body and extend along the transitional portions of the body.

13. The clip assembly as set forth in claim 11, wherein the body includes an outer peripheral edge and a side wall extending generally orthogonal along a portion of the outer peripheral edge.

14. A headliner assembly configured to facilitate the installation of the headliner assembly onto a roof bracket of a vehicle, the headliner assembly having a visor, the visor having a visor rod and a biasing member operative to bias the visor against the headliner so as to place the visor in a stowed position and generate a moment, the headliner assembly comprising:
a headliner body, the headliner body having an outer surface opposite an inner surface, and the inner surface includes a visor rod aperture in communication with the outer surface;
a clip configured to retain an end portion of the visor rod, the clip is disposed on the inner surface of the headliner; and
a base having a first portion configured to retain the clip, a second portion, and an outer surface extending from the first portion to the second portion, the outer surface of the first and second portions is generally planar and configured to engage the inner surface of the headliner body, and a distal end of the second portion is a spaced apart from the first portion so as to counter the moment generated when the visor is in the stowed position and engage the outer surface of the first portion flush with the inner surface the headliner to align the clip along a first axis and position the clip to be fittingly received by the roof bracket.

15. The headliner assembly as set forth in claim 14, further including a visor elbow bracket disposed on the outer surface of the headliner, the visor elbow bracket having an aperture configured to receive a portion of the visor rod and at least one fastener, and the first portion includes a receiving portion configured to engage the fastener to the base.

16. The headliner assembly as set forth in claim 14, wherein the inner surface of the headliner includes an arcuate surface bounding an area so as to define a depression, and the visor rod aperture is disposed in the depression.

17. The headliner assembly as set forth in claim 16, further including a transitional portion having an outer surface interconnecting the first portion to the second portion of the base, an outer surface of the transitional portion angled relative to the outer surface of the first portion to the second portions.

18. The headliner assembly as set forth in claim 17, wherein the transitional portion is contoured so as to flushingly engage the arcuate surface of the headliner and counter the moment generated when the visor is in its stowed position, and wherein the outer surface of the first portion remains flushingly engaged with inner surface the headliner, and the clip is aligned along a first axis so as to fittingly received by the roof bracket.

19. The headliner assembly as set forth in claim 14, further including a spacer having a predetermined width, the spacer having an aperture and adapted to mount onto the first portion of the base so as to align the aperture to the slot of the first portion.

* * * * *

UNITED STATES PATENT AND TRADEMARK OFFICE
CERTIFICATE OF CORRECTION

| | | |
|---|---|---|
| PATENT NO. | : 8,220,858 B2 | Page 1 of 1 |
| APPLICATION NO. | : 12/608695 | |
| DATED | : July 17, 2012 | |
| INVENTOR(S) | : Jonathan Keith Moenter | |

It is certified that error appears in the above-identified patent and that said Letters Patent is hereby corrected as shown below:

In the Specification:

At column 4, line number 28, Delete "60", Insert --62--

At column 4, line number 30, Delete "60", Insert --62--

In the Claims:

At column 8, claim number 14, line number 23, After is, Delete, "a"

At column 8, claim number 18, line number 50, After surface, Insert --of--

At column 8, claim number 18, line number 51, After to, Insert --be--

Signed and Sealed this
Nineteenth Day of August, 2014

Michelle K. Lee
*Deputy Director of the United States Patent and Trademark Office*